US009045319B2

(12) United States Patent
Nishikawa

(10) Patent No.: US 9,045,319 B2
(45) Date of Patent: Jun. 2, 2015

(54) VARIABLE-SPEED HOISTING MACHINE

(75) Inventor: Kazuhiro Nishikawa, Nakakoma-gun (JP)

(73) Assignee: KITO CORPORATION, Yamanashi (JP)

( * ) Notice: Subject to any disclaimer, the term of this patent is extended or adjusted under 35 U.S.C. 154(b) by 98 days.

(21) Appl. No.: 14/002,594

(22) PCT Filed: Mar. 6, 2012

(86) PCT No.: PCT/JP2012/055610
§ 371 (c)(1),
(2), (4) Date: Aug. 30, 2013

(87) PCT Pub. No.: WO2012/132777
PCT Pub. Date: Oct. 4, 2012

(65) Prior Publication Data

US 2013/0334996 A1 Dec. 19, 2013

(30) Foreign Application Priority Data

Mar. 31, 2011 (JP) ................................ 2011-077551

(51) Int. Cl.
*H02P 1/04* (2006.01)
*B66D 1/12* (2006.01)
*B66D 3/18* (2006.01)
*B66D 5/30* (2006.01)

(52) U.S. Cl.
CPC .. *B66D 1/12* (2013.01); *B66D 3/18* (2013.01); *B66D 5/30* (2013.01)

(58) Field of Classification Search
CPC ........ B60G 2400/91; B66D 1/12; B66D 3/18; B66D 5/30; H02P 2207/01; H02P 27/06; H03B 5/1293
USPC .......... 318/430, 778, 779, 801, 807, 808, 812
See application file for complete search history.

(56) References Cited

U.S. PATENT DOCUMENTS 4,451,112 A * 5/1984 Hattori et al. ................. 318/778
4,689,542 A * 8/1987 Ibori et al. .................... 318/778
(Continued)

FOREIGN PATENT DOCUMENTS

JP 05-97399 A 4/1993
JP 05-344774 A 12/1993
(Continued)

OTHER PUBLICATIONS

International Search Report dated May 29, 2012, issued in corresponding application PCT/JP2012/055610.

*Primary Examiner* — Bentsu Ro
*Assistant Examiner* — Thai Dinh
(74) *Attorney, Agent, or Firm* — Westerman, Hattori, Daniels & Adrian, LLP

(57) ABSTRACT

A variable-speed hoisting machine uses an electric motor having a pull-rotor brake as a hoisting motor and capable of supplying the electric motor with an electric current that can reliably release the pull-rotor brake at the time of starting an operation even in the case of a variable-speed hoisting machine such as an electric chain block in a variable-speed hoisting machine having an electric motor with a pull-rotor brake and an inverter controlling the speed of the electric motor in a soft-start manner, the inverter is set to operate according to a predetermined voltage-frequency (V-F) pattern.

4 Claims, 7 Drawing Sheets

(56) References Cited

U.S. PATENT DOCUMENTS

| | | | | | |
|---|---|---|---|---|---|
| 4,724,680 | A * | 2/1988 | Kawai | | 62/115 |
| 5,049,793 | A * | 9/1991 | Tanaka et al. | | 318/436 |
| 6,828,744 | B2 * | 12/2004 | Na | | 318/432 |

FOREIGN PATENT DOCUMENTS

| | | | |
|---|---|---|---|
| JP | 06-261570 | A | 9/1994 |
| JP | 2618131 | B2 | 6/1997 |

* cited by examiner

VARIABLE-SPEED HOISTING MACHINE

TECHNICAL FIELD

The present invention relates to variable-speed hoisting machines, such as electric chain blocks and electric hoists, in which an electric motor having a pull-rotor brake is used as a hoisting motor and electric power for driving the electric motor is supplied thereto through an inverter to control the speed thereof.

BACKGROUND ART

There are hoisting machines, such as electric chain blocks and electric hoists, which use an electric motor having a pull-rotor brake as a hoisting motor. The electric motor having a pull-rotor brake is configured as follows (detailed later). When the coil of the motor stator is not energized, the brake is activated, and the motor shaft is placed in a state of being constrained (braked). When the coil of the motor stator is energized, the brake is released by the action of a magnetic flux generated from the motor stator and that of the pull rotor. Thus, the motor shaft becomes unconstrained, and the motor rotor rotates.

As has been stated above, the electric motor with a pull-rotor brake has the advantage that the brake can be released to operate the electric motor simply by supplying an electric current to the coil of the motor stator. It is, however, necessary to supply the motor stator with sufficient electric current to release the brake when the electric motor is to be started. In the case of a variable-speed hoisting machine that is soft-started by using an inverter, the motor stator is not supplied with sufficient electric current to release the brake instantaneously when the electric motor is to be started. Therefore, there are problems such as that the brake cannot be released, or that the electric motor is started and operated with the brake dragging, for example, and the service life is reduced by overheating of the brake.

As a measure to solve the above-described problems, it is conceivable to apply the technique of an inverter-driven variable-speed hoisting machine described in Patent Literature 1. The electric motor of the variable-speed hoisting machine does not have a pull-rotor brake but operates as follows. At the start of a lifting operation, the inverter is operated according to a predetermined voltage-frequency (V-F) pattern, as shown by the dotted line in FIG. 1, from a state where the voltage is at a predetermined level V0 and the frequency is 0. When the output frequency reaches a frequency f1, a predetermined overvoltage V3 is output to the electric motor and the brake as an output voltage, as shown by the solid line, until the output frequency reaches a frequency f2, thereby supplying the brake coil with an electric current generating sufficient attraction force to release the brake. After the output frequency has reached the frequency f2, the overvoltage V3 is canceled, and the voltage and the frequency are increased according to the predetermined voltage-frequency (V-F) pattern to perform an accelerating operation.

The above-described technique may be applied to a variable-speed hoisting machine equipped with an electric motor having a pull-rotor brake. That is, at the start of a lifting operation, the electric motor is supplied with the overvoltage V3 output from the inverter for a predetermined period of time, thereby energizing the electric motor with sufficient electric power to generate attraction force required to release the pull-rotor brake. This makes it possible to release the brake but suffers from the problem that, when the acceleration of the hoisting machine is large, the length of time required for the output frequency of the inverter to reach from f1 to f2 is short, so that electric power required to release the pull-rotor brake cannot be supplied to the electric motor. For example, the acceleration time required for the inverter output frequency to reach from f1=5 Hz to f2=8 Hz is short in the case of an electric chain block, i.e. 20 msec, as compared to that of an electric hoist, i.e. 40 msec, as shown below. Thus, at the start of operating an electric chain block, the length of time during which the overvoltage electric power is supplied to the electric motor from the inverter is short, so that the brake cannot be released.

[Electric Hoist]
Acceleration time: 0.8 sec (0→60 Hz)
Low-speed frequency: 10 Hz (frequency f3 in FIG. 6)
Overvoltage interval: 5 Hz→8 Hz (f1→f2 in FIG. 1)
Overvoltage (V4 in FIG. 2) application time: 40 msec

[Electric Chain Block]
Acceleration time: 0.4 sec (0→60 Hz)
Low-speed frequency: 10 Hz (frequency f3 in FIG. 6)
Overvoltage interval: 5 Hz→8 Hz (f1→f2 in FIG. 1)
Overvoltage (V4 in FIG. 2) application time: 20 msec To solve the above-described problem that it is impossible to ensure a sufficient time for supplying an electric current required to release the pull-rotor brake, it is conceivable to adopt a method of ensuring an electric current for releasing the pull-rotor brake and maintaining the brake in the released state by reducing the overvoltage application start frequency (i.e. reducing the frequency f1 in FIG. 1) as in an inverter control apparatus disclosed in Patent Literature 2. However, reducing the output frequency f1 at the start of overvoltage application has an adverse effect on the power cycle of a switching device (IGBT) constituting the inverter (i.e. the service life of the switching device is reduced).

CITATION LIST

Patent Literature

[PTL 1] Japanese Patent Application Publication No. Hei 5-97399

[PTL 2] Japanese Patent Application Publication No. Hei 5-344774

SUMMARY OF INVENTION

Technical Problem

The present invention has been made in view of the above-described circumstances. An object of the present invention is to provide a variable-speed hoisting machine using an electric motor having a pull-rotor brake as an electric motor driving the variable-speed hoisting machine and capable of supplying the electric motor with an electric current that can reliably release the pull-rotor brake at the start of an operation even in the case of a variable-speed hoisting machine such as an electric chain block, which has a short acceleration time, without reducing the output frequency at the start of overvoltage application.

Solution to Problem

To solve the above-described problem, the present invention provides a variable-speed hoisting machine having an electric motor with a pull-rotor brake that drives the variable-speed hoisting machine, and an inverter driving the electric motor by supplying electric power thereto and controlling the speed of the electric motor in a soft-start manner. The inverter is set to operate according to a predetermined voltage-frequency (V-F) pattern. The voltage-frequency (V-F) pattern is configured so that, assuming that f1 is a lowest frequency at which electric power is output to the electric motor, f2 is a highest frequency at which an overvoltage is output to the electric motor, f3 is a highest output frequency ($f1<f2<f3$), and V1, V2 and V3 are output voltages that the inverter outputs in correspondence to the frequencies f1, f2 and f3, respectively, then V2 is not greater than V1 ($V2 \leq V1$), and as the frequency increases from f1 to f2, the output voltage decreases from V1 to V2, and further, as the frequency increases from f2 to f3, the output voltage increases from V2 to V3 substantially in proportion to the frequency. At the time of starting the electric motor, the acceleration (output frequency increase rate; see $\alpha$ in FIG. 5) in a time interval during which the frequency reaches from f1 to f2 is set smaller than the acceleration (output frequency increase rate; see $\beta$ in FIG. 5) in a time interval during which the frequency reaches from f2 to f3, thereby supplying the electric motor with sufficient electric power to release the pull-rotor brake.

Further, the above-described variable-speed hoisting machine of the present invention is a hoisting machine operable at two speeds: a low speed, and a high speed. The frequency f2 is not greater than an output frequency for a low-speed operation from the inverter.

Further, the above-described variable-speed hoisting machine of the present invention is an electric chain block.

Advantages of Invention

As has been stated above, the interval between the frequencies f1 and f2 is defined as an overvoltage interval during which an overvoltage is applied, and by reducing the acceleration (inverter output frequency increase rate) in the overvoltage interval, the time required for the frequency to increase from f1 to f2 is increased. As a result, the overvoltage application time can be sufficiently ensured. In other words, because the motor stator can be supplied with electric power required to release the pull-rotor brake at the time of starting, it is possible to provide a variable-speed hoisting machine free from the problem that the electric motor is operated with the brake partially released, and hence the brake is overheated, resulting in a reduced service life.

In addition, the frequency f2 at which an overvoltage is output is set not greater than the inverter output frequency for the low speed, and hence no overvoltage is output to the electric motor when the variable-speed hoisting machine is operated at the low speed. Accordingly, it becomes possible to operate the variable-speed hoisting machine continuously at the low speed.

DESCRIPTION OF EMBODIMENTS

An embodiment of the present invention will be explained below in detail. In this embodiment, the present invention will be explained with regard to an example in which the present invention is applied to an electric chain block as a variable-speed hoisting machine. It should, however, be noted that the present invention is widely applicable to variable-speed hoisting machines that are driven by an electric motor having a pull-rotor brake, the electric motor being variably speed-controlled by electric power output from an inverter, and that have a short acceleration time.

Figure 2:
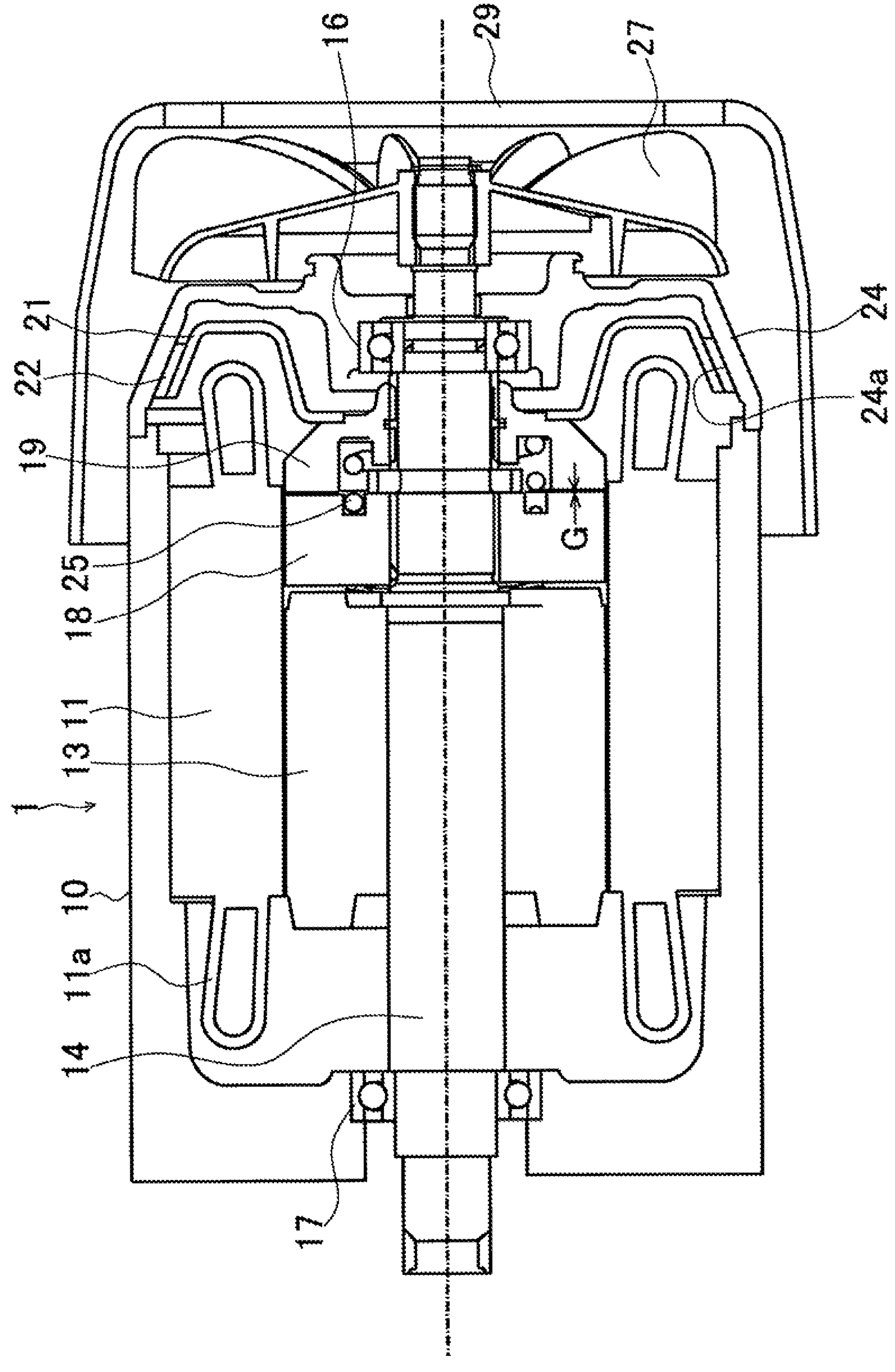
FIG. 2 is a diagram showing a configuration example of an electric motor with a pull-rotor brake of a variable-speed hoisting machine according to the present invention.

First, an electric motor with a pull-rotor brake of a variable-speed hoisting machine according to the present invention will be explained. FIG. 2 is a sectional view schematically showing the structure of an electric motor having a pull-rotor brake. An electric motor (induction motor) 1 with a pull-rotor brake used in the present invention has a motor stator 11 fitted in a motor frame 10. A motor rotor 13 is rotatably disposed in a circular cylindrical hollow portion of the motor stator 11. Reference numeral 14 denotes a motor shaft extending through the central portion of the motor rotor 13. Both ends of the motor shaft 14 are rotatably supported by bearings 16 and 17, respectively.

Reference numeral 18 denotes a pull rotor (attraction core) secured to the motor shaft 14. Reference numeral 19 denotes a brake drum base (core) axially slidably connected to the motor shaft 14 through spline connection. Reference numeral 21 denotes a brake drum secured to the brake drum base 19. Reference numeral 22 denotes a brake plate secured to an outer peripheral portion of the brake drum 21. Reference numeral 24 denotes a motor end cover. The inner peripheral surface 24*a* of the motor end cover 24 serves as a braking surface with which the brake plate 22 comes into sliding contact. Reference numeral 25 denotes a brake spring interposed between the brake drum base 19 and the pull rotor 18. When the coil 11*a* of the motor stator 11 is not energized, a gap G is formed between the pull rotor 18 and the brake drum base 19 by the resilient force of the brake spring 25. Reference numeral 27 denotes a fan secured to one end of the motor shaft 14. Reference numeral 29 denotes a fan cover.

In the pull-rotor type electric motor 1 having the above-described structure, when the coil 11*a* of the motor stator 11 is not energized, the gap G is formed between the pull rotor 18 and the brake drum base 19 by the resilient force of the brake spring 25, as stated above, and the brake plate 22 secured to the brake drum 21 is pressed against the inner peripheral surface 24*a* of the motor end cover 24. Thus, the motor shaft 14 is placed in a state of being constrained (braked). When a large electric current is supplied to the coil 11*a* of the motor stator 11 (i.e. the coil 11*a* is current-energized by applying an overvoltage thereto), a magnetic flux is generated from the motor stator 11, causing the brake drum base 19 to be attracted through the pull rotor 18 against the resilient force of the brake spring 25. Consequently, the brake plate 22 secured to the brake drum 21 separates from the inner peripheral surface 24*a* of the motor end cover 24. Thus, the motor shaft 14 becomes unconstrained, and the motor rotor 13 becomes rotatable.

Figure 3:
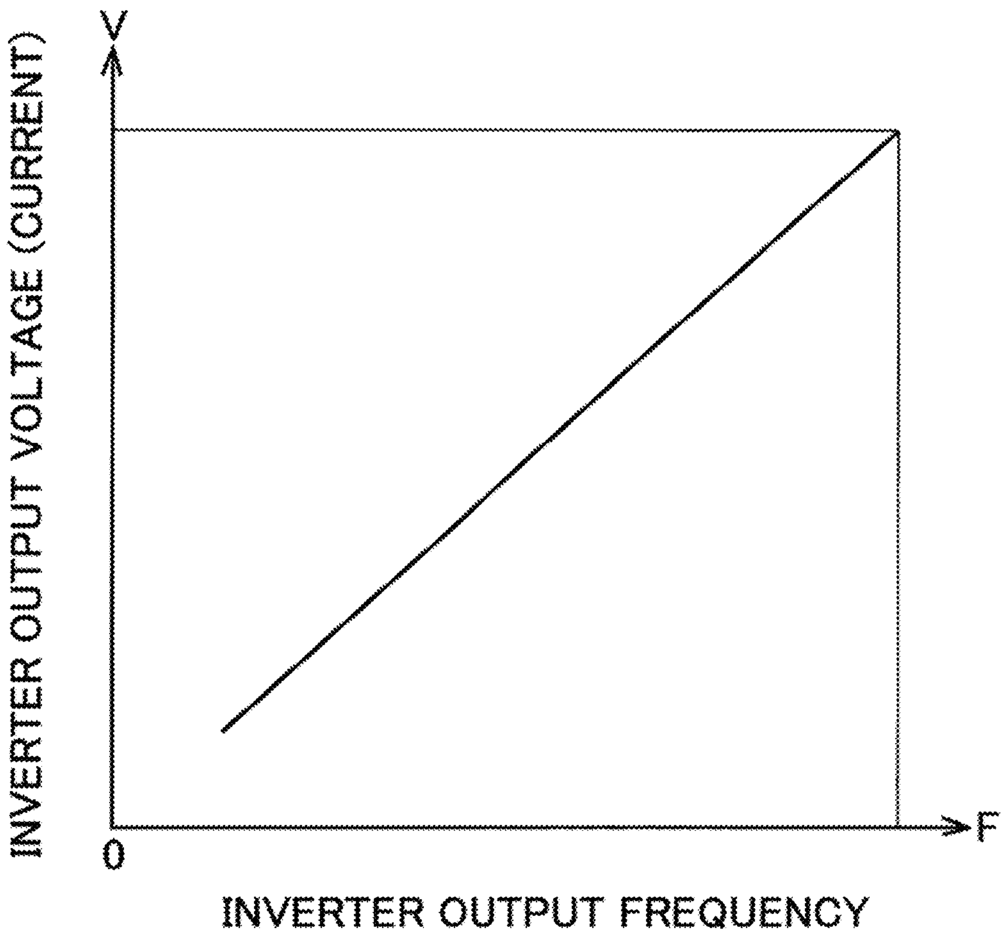
FIG.3 PRIOR ART
FIG. 3 is a diagram showing a V-F pattern of a conventional inverter-driven variable-speed hoisting machine.

The electric motor with the pull-rotor brake has the advantage that the brake can be released to operate the electric motor simply by supplying an electric current to the coil 11*a* of the motor stator 11, as stated above. However, in the case of a variable-speed hoisting machine in which an electric motor is supplied with an electric current from an inverter to drive the electric motor in a soft-start manner and to control the speed, the electric motor is started with a low frequency at the time of starting an operation and accelerated with a predetermined acceleration until an operating frequency is reached. Thereafter, the electric motor is operated at a constant speed. During this time, the electric current value is controlled according to a voltage-frequency (V-F) pattern as shown in FIG. 3. Accordingly, when the frequency is low, a low voltage is output to the electric motor, so that a large starting current as in the case of a commercial power supply does not flow. Therefore, at the time of starting an operation, the electric motor cannot be supplied with sufficient electric current to cancel (release) the brake. Consequently, the electric motor is operated with the brake partially released, and hence the brake is overheated, resulting in a reduced service life and other problems.

Figure 1:
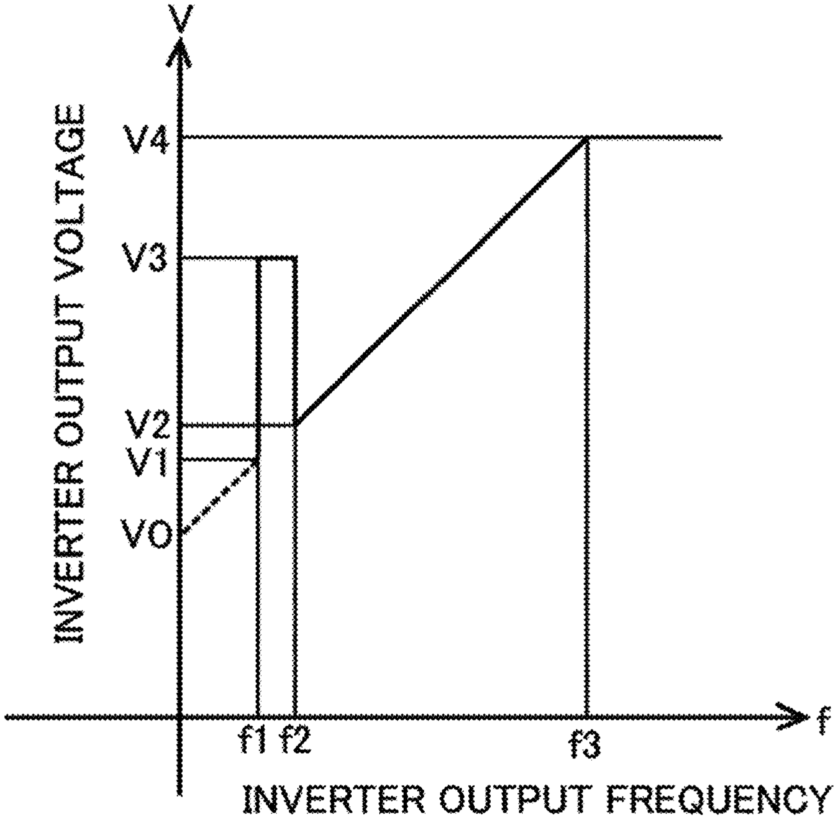
FIG.1 PRIOR ART
FIG. 1 is a diagram showing the relationship between the inverter output frequency and output voltage at the time of starting a conventional variable-speed hoisting machine.

In Patent Literatures 1 and 2, an overvoltage (overcurrent) V3 is output while the frequency f is increasing from f1 to f2 at the time of starting (see FIG. 1). With this simple scheme, however, it is necessary for a hoisting machine having a short acceleration time to increase the frequency f2 in order to ensure the time for outputting the overvoltage V3, which involves the problem that a low-speed operation is unavoidably performed with the overvoltage. If the frequency f1 at which output is started at the time of starting is reduced to increase the length of time during which the overvoltage is output, or if an even higher voltage is output so as to enable the pull-rotor brake to be released even if the overvoltage application time is short, the power cycle (service life) of the power device (IGBT) constituting the inverter is reduced undesirably.

If the air gap G between the pull rotor 18 and the brake drum base 19 is set small so that the pull-rotor brake can be released even with a low voltage, it is necessary to provide a structure capable of adjustment so that the air gap G will not widen beyond a specified value even if the brake plate 22 has become worn. This solution has the problem that the structure is complicated and needs maintenance.

Figure 4:
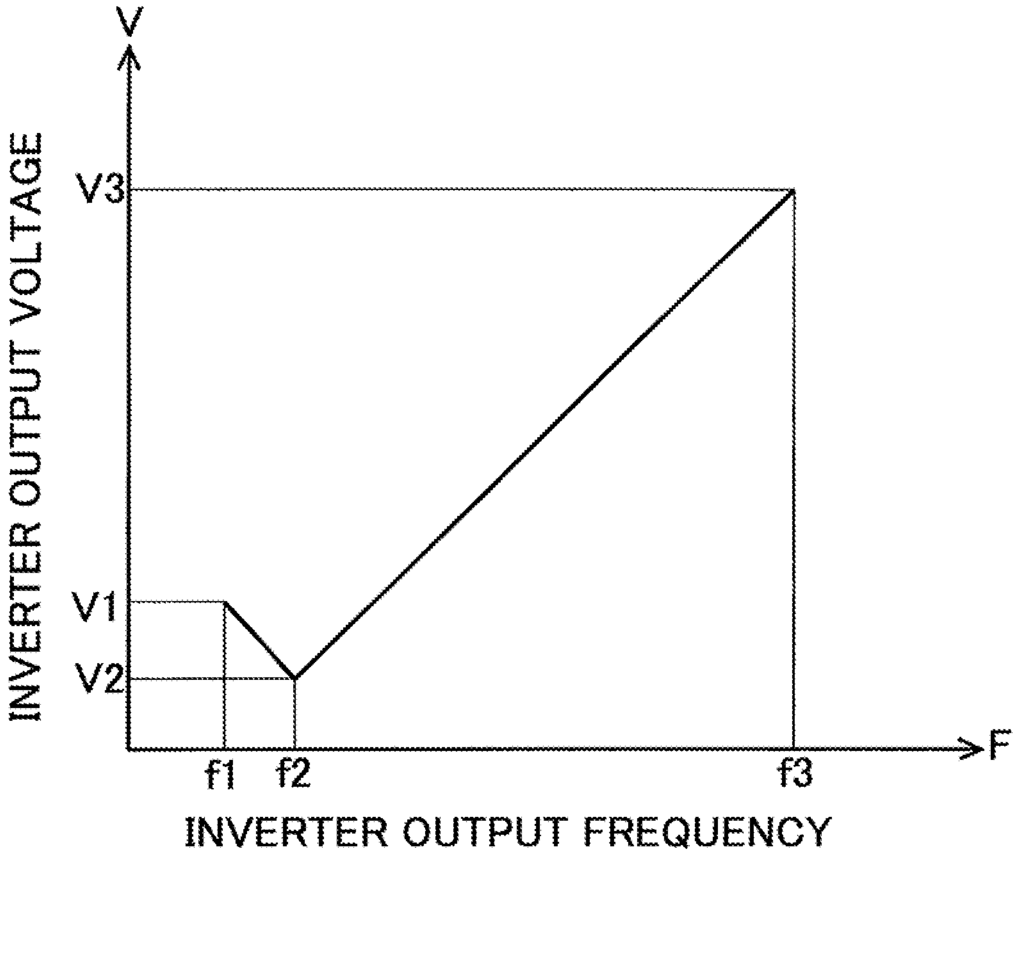
FIG. 4 is a diagram showing a V-F pattern at the time of starting an operation of the variable-speed hoisting machine according to the present invention.

Therefore, to solve the above-described problems, the variable-speed hoisting machine according to the present invention is configured to start at the frequency f1 and to output an overvoltage V1 to V2 during the time between the frequencies f1 and f2, as shown in FIG. 4. The overvoltage V1 to V2 makes it possible to supply sufficient electric current to release the pull-rotor brake. There may be conceived a method in which the frequency f2 is increased to increase the overvoltage interval, conversely to the above. This method, however, has the following problem. Because a steady-state operation cannot be performed during the overvoltage interval, the lowest frequency of the low-speed operation increases, which impairs the positioning performance of the hoisting machine.

The present invention has been made in view of the above-described problems. According to the present invention, the voltage-frequency (V-F) pattern is configured as shown in FIG. 4. That is, assuming that f1 is a lowest output frequency at which the inverter outputs a voltage to the electric motor of the variable-speed hoisting machine, f2 is a highest frequency at which an overvoltage is output to the electric motor, f3 is a highest output frequency, and V1, V2 and V3 are output voltages corresponding to the frequencies f1, f2 and f3, respectively, then V2 is not greater than V1 (V2≤V1), and as the frequency increases from f1 to f2, the output voltage decreases from V1 to V2, and further, as the frequency increases from f2 to f3, the output voltage increases from V2 to V3 substantially in proportion to the frequency.

Figure 5:
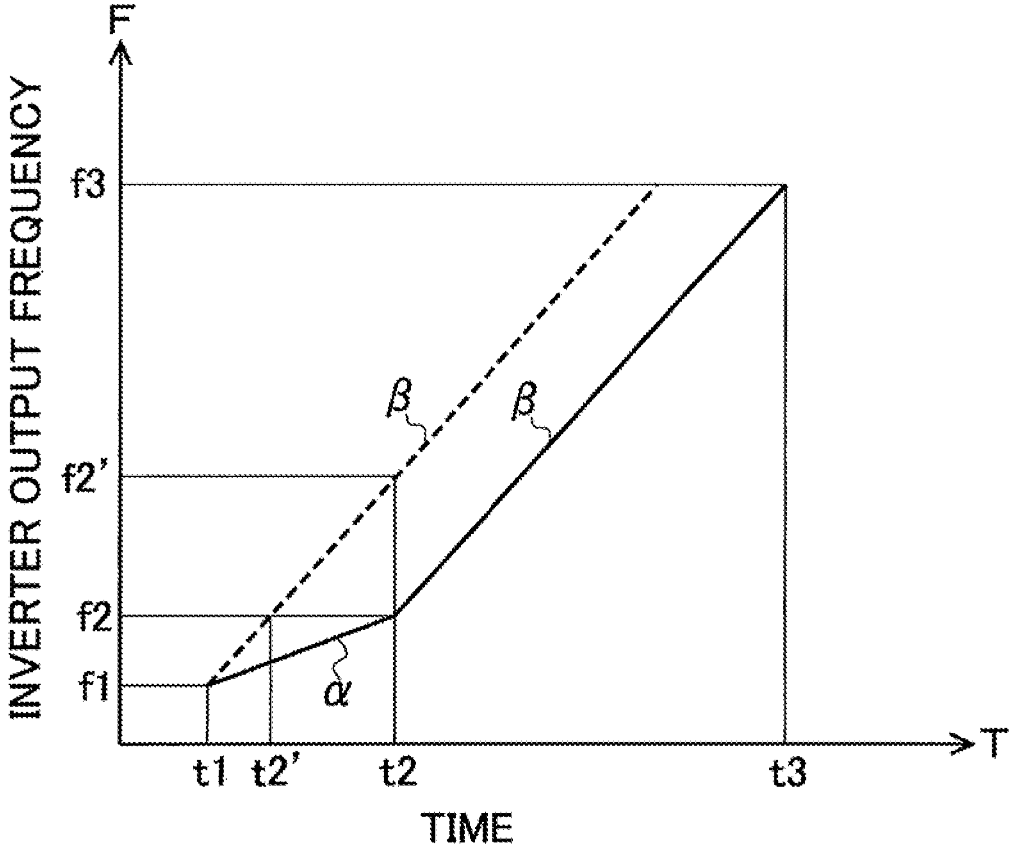
FIG. 5 is a diagram showing an acceleration pattern of soft-start control of the variable-speed hoisting machine according to the present invention.

Next, an acceleration pattern of soft-start control is shown in FIG. 5. Frequencies f1, f2 and f3 shown in FIG. 5 correspond to the frequencies f1, f2 and 3, respectively, shown in FIG. 4. When the electric motor of the variable-speed hoisting machine is started, the inverter outputs electric power to the electric motor while increasing the output frequency fat an output frequency increase rate (acceleration) $\alpha$ from f1 to f2. When the frequency f is from f2 to f3, the inverter outputs electric power to the electric motor while increasing the frequency at an output frequency increase rate (acceleration) $\beta$. As shown in the figure, the output frequency increase rate (acceleration) a is smaller than the output frequency increase rate (acceleration) $\beta$ ($\alpha<\beta$), thus providing gentle acceleration.

When the acceleration is constant ($\beta$) in the time interval during which the frequency reaches from f1 to f3, as shown by the broken line in FIG. 5, if the electric motor is started from the frequency f1 and accelerated until the frequency f3 is reached, the acceleration time from f1 to f2 is t2'−t1. In contrast, in the present invention, the acceleration time from f1 to f2 is t2−t1, and therefore, the overvoltage application time can be made longer than when the acceleration is constant. If the overvoltage application time is made coincident with t2−t1, the frequency f2' in this case is higher than f2. Consequently, if the electric motor is operated in a low-speed region not higher than f2', an overvoltage operation occurs. It is unfavorable to operate the electric motor continuously in the overvoltage condition. In this regard, according to the present invention, the speed at which the electric motor can be operated continuously can be reduced to the frequency f2.

As has been stated above, it is possible according to the present invention to supply sufficient electric current to release the pull-rotor brake without sacrificing the inverter power cycle (inverter service life) and the hoisting machine positioning performance (low-speed operation performance). It should be noted that, when the present invention is applied, the time required for the frequency to reach f3 becomes longer by t2−t2'. However, the delay time t2−t2' (several tens msec) is no problem in the case of an electric chain block.

Figure 6:
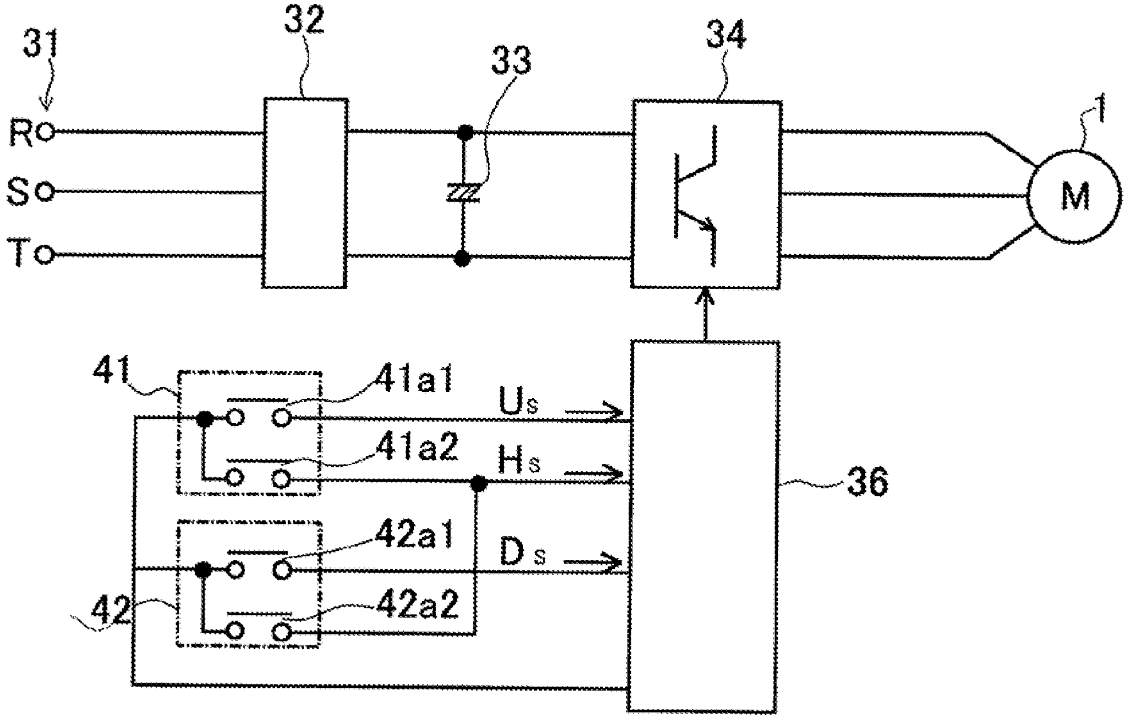
FIG. 6 is a circuit diagram showing a system configuration example of the hoisting machine according to the present invention.

FIG. 6 is a block circuit diagram showing the system configuration of the variable-speed hoisting machine according to the present invention. Reference numeral 1 denotes the above-described electric motor (induction motor) equipped with the pull-rotor brake. The electric motor 1 is supplied with a three-phase alternating current from a three-phase alternating-current power supply 31 after the alternating current has been converted into a direct current through a rectifier circuit 32 and a smoothing capacitor 33 and further converted into a three-phase alternating current of a predetermined frequency through an inverter main circuit 34. The inverter main circuit 34 has six transistors connected in a bridge configuration of three pairs of transistors corresponding to the three-phase alternating current and is controlled by an inverter control unit 36 to convert the direct current input to the inverter main circuit 34 into a three-phase alternating current of a predetermined frequency. The six transistors of the inverter main circuit 34 are controlled by a pulse-width modulation signal (hereinafter referred to as a "PWM signal") given from a PWM signal generating circuit (not shown) of the inverter control unit 36.

The inverter control unit 36 has an output voltage-output frequency pattern (hereinafter referred to as a "voltage-frequency (V-F) pattern") previously set therein to output electric power having a controlled output frequency and voltage from the inverter main circuit 34. The inverter main circuit 34 is controlled according to the voltage-frequency (V-F) pattern. Thus, the transistors of the inverter main circuit 34 are controlled by the inverter control unit 36 to output a three-phase alternating current corresponding to the PWM signal, thereby rotating the electric motor as a load.

Reference numeral 41 denotes a normally-open two-step push switch for a lifting operation. When the push switch 41 is pressed to a first step, a pushbutton switch 41*a*1 is closed. When the push switch 41 is pressed to a second step, a pushbutton switch 41*a*2 is closed. Reference numeral 42 denotes a normally-open two-step push switch for a lowering operation. When the push switch 42 is pressed to a first step, a pushbutton switch 42*a*1 is closed. When the push switch 42 is pressed to a second step, a pushbutton switch 42*a*2 is closed. When the pushbutton switch 41*a*1 is closed, a lifting command signal $U_S$ is input to the inverter control unit 36. When the pushbutton switch 42*a*1 is closed, a lowering command signal $D_S$ is input to the inverter control unit 36. When either the pushbutton switch 41*a*2 or the pushbutton switch 42*a*2 is closed, a high-speed command signal $H_S$ is input to the inverter control unit 36.

The procedure for operating the soft-start two-speed variable-speed hoisting machine having the above-described system configuration will be explained based on FIGS. 5 and 6. The inverter control unit 36 has an acceleration pattern registered therein which represents the soft-start control shown in FIG. 5. The inverter control unit 36 controls the output frequency and voltage to be output from the inverter main circuit 34 according to the push switch input. When the operator wants to perform a low-speed operation, he or she closes the pushbutton switch 41*a*1. Consequently, a lifting command signal $U_S$ is input to the inverter control unit 36, and the inverter control unit 36 causes the inverter main circuit 34 to output electric power with frequency f1 and voltage V1. The electric motor is accelerated to the frequency f2 with an acceleration $\alpha$(=((f2−f1)/(t2−t1))). During this time, an overcurrent flows, and thus the pull-rotor brake is released. After having been accelerated to the frequency f2, the electric motor is allowed to continue a constant-speed operation (low-speed operation) at the frequency f2. If the pushbutton switch 41*a*1 is opened thereafter, the inverter control unit 36 cuts off the output rapidly, thereby allowing the pull-rotor brake to perform braking.

If the operator, when performing the constant-speed operation (low-speed operation), wants to switch the operation to a high-speed operation, he or she further presses the push switch 41 to close the pushbutton switch 41*a*2 in addition to the pushbutton switch 41*a*1. Consequently, a high-speed command signal $H_S$ is input to the inverter control unit 36 in addition to the lifting command signal $U_S$. Accordingly, the inverter control unit 36 accelerates the electric motor to the frequency f3 with an acceleration $\beta$(=((f3−f2)/(t3−t2))) and thereafter allows the electric motor to continue a constant-speed operation (high-speed operation) at the frequency f3. If the pushbutton switch 41*a*2 is opened in the state where the pushbutton switches 41*a*1 and 41*a*2 are closed, the electric motor is decelerated from the frequency f3 to the frequency f2 with the deceleration $\beta$ and allowed to continue the operation (low-speed operation) at the frequency f2.

If the operator closes both the pushbutton switches 41*a*1 and 41*a*2 at one push at the time of starting, the inverter main circuit 34 outputs electric power with frequency f1 and voltage V1 and accelerates the electric motor to the frequency f2 with the acceleration $\alpha$(=((f2−f1)/(t2−f1))). During this time, an overcurrent flows, and thus the pull-rotor brake is released. After the frequency f2 has been reached, the electric motor is continuously accelerated to the frequency f3 with the acceleration $\beta$(=((f3−f2)/(t3−f2))) and allowed to continue a constant-speed operation (high-speed operation) at the frequency f3.

If the operator opens the pushbutton switches 41*a*1 and 41*a*2 at a stretch during the constant-speed operation (high-speed operation), the inverter main circuit 34 outputs electric power while decelerating the electric motor from the frequency f3 to the frequency f2 with the deceleration $\beta$. When the electric motor has been decelerated to the frequency f2, the output is cut off, thereby allowing the pull-rotor brake to perform braking. It should be noted that the low-speed operation in the low-speed region is preferably performed at the frequency f2, but the frequency for the low-speed operation in the low-speed region may be properly set to a frequency higher than the frequency f2. In this case, the acceleration used in a region exceeding the frequency f2 may be properly set equal to or less than the acceleration $\beta$. It should be noted that the procedure for the lowering operation is substantially the same as the above-described lifting operation procedure, and therefore, a description thereof is omitted.

Thus, the pull-rotor brake can be reliably released, without sacrificing the inverter power cycle and the hoisting machine positioning performance, by applying an overvoltage at a frequency lower than the low-speed operation frequency of the hoisting machine and making the acceleration $\alpha$ during the time of overvoltage application smaller than the acceleration $\beta$ at other frequencies. Accordingly, it is possible to dissolve such problems that the electric motor is operated with the pull-rotor brake partially released, and hence the brake is overheated, resulting in a reduced service life.

Figure 7:
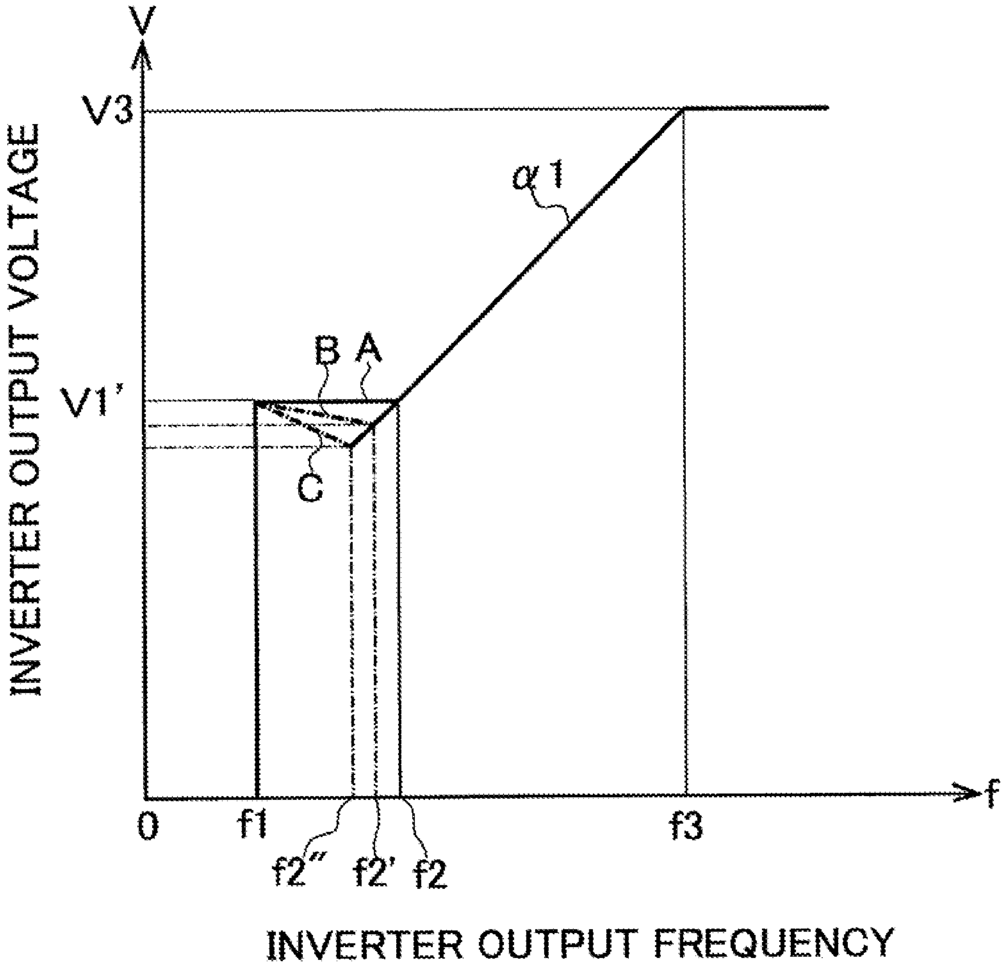
FIG. 7 is a diagram showing other examples of the V-F pattern at the time of starting an operation of the variable-speed hoisting machine according to the present invention.

Although one embodiment of the present invention has been explained above, the present invention is not limited to the above-described embodiment but can be modified in a variety of ways without departing from the scope of the claims and the technical idea indicated in the specification and the drawings. For example, the voltage value V during the period of the frequency f=f1 to f2 in the voltage-frequency (V-F) pattern in FIG. 4 may be changed as shown in FIG. 7. That is, the voltage value may be constant at V1' as shown by A in FIG. 7. Alternatively, the voltage value V during the period of the frequency f=f1 to f2' or to f2" may drop at a predetermined rate as shown by B and C in FIG. 7. Even with such modifications, it is possible to reduce the acceleration during that period and to ensure an electric current required to release the pull-rotor brake and a current supply time required to keep the brake released. Although the invention of this application has been explained with regard to an electric chain block as an example of variable-speed hoisting machines, the present invention is widely applicable to hoisting machines having a short acceleration time.

INDUSTRIAL APPLICABILITY

In the present invention, the inverter is set to operate according to a predetermined voltage-frequency (V-F) pattern, in which the frequency and voltage of electric power that the inverter outputs to the electric motor at the time of starting an operation are denoted by f1 and V1, respectively. The voltage V1 is a voltage at which sufficient electric current to release the pull-rotor brake flows. Further, in order to ensure the overvoltage application time (t2−t1) sufficiently, the frequency acceleration during the overvoltage application time is made gentler than in other frequency intervals. Even in a variable-speed hoisting machine that is accelerated in a short period of time, for example, an electric chain block, it is possible to supply an electric current for reliably releasing the pull-rotor brake at the time of starting an operation without sacrificing the power cycle of the inverter of the electric motor and the positioning performance of the hoisting machine. In addition, the present invention is applicable as a variable-speed hoisting machine free from the problem that the electric motor is operated with the brake partially released, and hence the brake is overheated, resulting in a reduced service life.

LIST OF REFERENCE SIGNS

1: Electric motor having pull-rotor brake
10: Motor frame
11: Motor stator
13: Motor rotor
14: Motor shaft
16: Bearing
17: Bearing
18: Pull rotor (attraction core)
19: Brake drum base (core)
21: Brake drum
22: Brake plate
24: Motor end cover
25: Brake spring
27: Fan
29: Fan cover
31: Three-phase alternating-current power supply
32: Rectifier circuit
33: Smoothing capacitor
34: Inverter main circuit
36: Inverter control unit
41: Normally-open two-step push switch for lifting operation
42: Normally-open two-step push switch for lowering operation

The invention claimed is:

1. A variable-speed hoisting machine having an electric motor with a pull-rotor brake that drives the variable-speed hoisting machine, and an inverter driving the electric motor by supplying electric power thereto and controlling a speed of the electric motor in a soft-start manner, wherein the inverter is set to operate according to a predetermined voltage-frequency (V-F) pattern, the voltage-frequency (V-F) pattern being configured so that, assuming that f1 is a lowest frequency at which electric power is output to the electric motor, f2 is a highest frequency at which an overvoltage is output to the electric motor, f3 is a highest output frequency (fl<f2<f3), and V1, V2 and V3 are output voltages that the inverter outputs in correspondence to the frequencies fl, f2 and f3, respectively, then V2 is not greater than V1 (V2≤V1), and as the frequency increases from f1 to f2, the output voltage decreases from V1 to V2, and further, as the frequency increases from f2 to f3, the output voltage increases from V2 to V3 substantially in proportion to the frequency, wherein, at a time of starting the electric motor, an acceleration (output frequency increase rate) in a time interval during which the frequency reaches from f1 to f2 is set smaller than an acceleration (output frequency increase rate) in a time interval during which the frequency reaches from f2 to f3, thereby supplying the electric motor with sufficient electric power to release the pull-rotor brake.

2. The variable-speed hoisting machine of claim 1, which is a hoisting machine operable at two speeds: a low speed, and a high speed, wherein the frequency f2 is not greater than an output frequency for a low-speed operation from the inverter.

3. The variable-speed hoisting machine of claim 1, which is an electric chain block.

4. The variable-speed hoisting machine of claim 2, which is an electric chain block.

* * * * *